Patented Apr. 11, 1950

2,503,664

UNITED STATES PATENT OFFICE 2,503,664

COLORATION OF FRESH CITRUS FRUITS

Carl E. Gericke, Puerto Castilla, Honduras, assignor to American Machinery Corporation, Orlando, Fla., a corporation of Florida No Drawing. Application July 16, 1949, Serial No. 105,270

9 Claims. (Cl. 99—103)

This invention relates to the commercial preparation of fresh whole fruit for the market, and particularly to the impartation of a desirable coloration. More in particular this refers to citrus fruit which reaches a stage of maturity wherein the fruit itself has come to a ripened condition but the skin or peel thereof has an off-color and in extreme cases a yellow or greenish yellow color. This application for Letters Patent is a continuation-in-part of the copending application Serial No. 692,701, filed August 23, 1946.

As disclosed in Patent No. 1,909,860, issued to Rodney B. Harvey, citrus fruits vary in color, but variations from the standard varietal color does not necessarily mean that the fruit is immature or of low quality. This patent discloses a method of enhancing the color of fruit by subjecting the fruit to the action of a neutral or alkaline oleaginous material containing a coloring agent and suggests further that at least part of this mixture is neutralized by a base. This produces a soap which in conjunction with the proper dye is used to treat off-color fruit. This solution due to its constituents is of necessity alkaline in nature. The Patent No. 2,062,903 to James O. Handy treats citrus fruit with an aquosolufacient which comprises a sodium salt of various compounds or a triethanolamine salt of a fatty acid.

These patents disclose methods for the treatment of citrus fruit which in actual practice require temperatures much in excess of 120° F. for coloring the orange satisfactorily—i. e. usually between 127° F. and 132° F.—with an oil soluble dye suspended in an alkaline aqueous bath containing an oily solvent for the dye or a saponified oil by which the dye is dispersed in the solution, with or without added oily solvent for the dye, so as to impregnate the skin or peel of the fruit when any dyeing of the fruit is contemplated. In such alkaline baths, unless great care is exercised to maintain the primary concentration of solvent therein, when said solvent is used, and the proper emulsification of it, the fruit is burned and, where soap and dyes only are employed in such baths, very high temperatures in the order of 130° to 140° F. are required.

The object of the present invention is to enhance the natural coloration of citrus fruit, particularly oranges, by the use of a color bath which does not employ a soap but in which the soap is replaced by a surface active agent of a cationic type that suspends the dye in such a state of subdivision so that its entrance into the peel is facilitated and accomplished at considerably lower temperatures than those at present employed, thus retaining the flavor of the fruit; that provides a medium which enhances the activity of a fungicidal agent for the fruit; that may be compounded with a greater ease than known color baths; that may be used with water containing iron and other minerals without previously being subjected to softening treatment; and that gives a suspension of the dye in the concentrated form that has better keeping qualities, as respects suspension, in storage for longer periods of time prior to dilution for use than other known citrus fruit coloring concentrates.

These objects are attained by the use of an aqueous acid bath, containing a cationic surface active agent and a suspension of a dyeing agent, and bringing the fruit into contact with such bath.

Surface active agents have several general uses, one of which is a dispersion of a solid into a liquid to produce a suspensoid. These surface active agents fall into three general classifications, hydrophilic, anionic and cationic. The cationic and anionic compounds are usually long chain carbon compounds with a terminal grouping capable of ionizing when put into solution in an aqueous medium. When finely divided material, which is to be dispersed, is placed or produced in such an aqueous medium containing an ionized surface active agent, the molecules of the ionized surface active agent orient themselves so that the carbon chain of the molecules either dissolve in or are attracted by the finely divided material to be dispersed, while the terminal groupings bearing the charge of the molecules extend into the aqueous medium. In this manner an aggregation of finely divided and stabilized particles are formed in the aqueous medium, each of which are stabilized by one or more electric charges. The surface active agents used in carrying out the present invention are of the cationic type which offer many advantages over the other two types of surface active agents previously used.

The hydrophilic surface agents with respect to their molecular structure are typified by a long carbon chain molecule which bears no electric charge in solution, while the anionic surface agents are typified by a long carbon chain molecule which bears a negative charge when acting as an emulsifier or dispersing agent, such as a fatty acid. On the other hand, the cationic agents can be typified by a long carbon chain molecule with a terminal nitrogen containing group which bears a positive charge when acting as a stabilizer for an emulsion or suspensoid.

In carrying out the present invention an organic amine salt solution is mixed, with or without heating (heating being used to accelerate solution), with an oil-soluble dye to form a concentrate. This concentrate is further diluted with water to make a bath for the treatment of citrus fruit, more in particular, oranges. The organic amine salts that fall within the scope of this invention are the amine salts of a monobasic acid either organic or inorganic. The amines from which these salts are made must have one or more of the hydrogen atoms attached to the ammonium nitrogen replaced by hydrocarbon radicals. It has been found that not all of the compounds falling within this class will work satisfactorily, but only those compounds wherein at least one of the hydrocarbon groups contains 10 to 20 carbon atoms. It should further be related that the secondary and tertiary compounds should contain only one carbon chain of the type just specified and that the second side grouping in the secondary amine and the second and third side groups in the tertiary amine should contain as few carbon atoms as possible. The description herein given should not be construed to mean that ring configurations must be absent since it has been found that some compounds consisting of a long carbon chain molecule, to which is molecularly and terminally attached a nitrogen containing ring, are also effective in the salt form as a surface active agent. Such a compound is manufactured by Carbon and Carbide Chemical Corporation of New York city, New York.

Another example of the production of an amine, having the properties above set forth, is a condensation product obtained by reacting ethylene oxides with a substituted amine having a side chain of between 10 to 20 carbon atoms and two replaceable hydrogen atoms attached to the nitrogen atom. This type of reaction is represented by the condensation product of N primary hexa decyl amine with ethylene oxide, as may be expressed as follows:

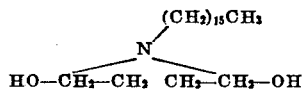

The acids used to form the amine salts are monobasic acids such as hydrochloric, hydrobromic, acetic, formic, lactic, etc.

It is well known that many commercial amines on the market are handled under trade names and are sometimes a mixture of amines rather than a pure compound. These mixtures are satisfactory. The Sharples Chemical Company and Armour & Company are two corporations marketing such amines.

The following compounds have been tried and have given satisfactory results:

Trade name or designation by Armour & Company as of 1945

| Amines, present primary | Chain Length | AM-1120 | AM-1140 | AM-1160 | AM-118.5-B | AM-1180 | AM-Coco-B |
|---|---|---|---|---|---|---|---|
| | | Per cent | Per cent | Per cent | Per cent | Per cent | Per cent |
| Octyl | $C_8$ | | | | | | 8 |
| Decyl | $C_{10}$ | | | | | | 9 |
| Dodecyl | $C_{12}$ | 90 | 4 | | | | 47 |
| Tetradecyl | $C_{14}$ | 9 | 90 | | | | 18 |
| Hexadecyl | $C_{16}$ | | 4 | 90 | 30 | 6 | 8 |
| Octadecyl | $C_{18}$ | | | 6 | 25 | 93 | 5 |
| Octadecenyl | $C_{18}$ | 1 | 2 | 4 | 45 | 1 | 5 |
| Ave. Mol. Wt. | | 185 | 213 | 244 | 263 | 267 | 200 |
| Primary amine by titration | | 97 | 97 | 97 | 97 | 97 | 97 |
| Approx. melting point, °C | | 24 | 29 | 38 | 41 | 55 | 21 |

All were of the "purified" grade (distilled).

One of the preferred materials is the amine prepared from abietic acid and this substance has the formula

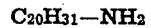

Any one of the above amines or any mixture thereof may be employed. In addition to the compounds above noted, the compounds known as AM-2120 and AMCL-4 COCO-C may be employed, the first compound consisting primarily of didodecyl ammonium chloride (secondary amine) and the second compound consisting of a mixture of quaternary ammonium salts containing an aliphatic side chain having 12 to 14 carbon atoms. The best results were obtained with AMCL-4 Coco-C and AM-Coco-B and AM-2120 and the amine prepared from abietic acid.

As one example or formula for practicing the invention, mix 1 pound of a dispersible edible oil-soluble dye (preferably Food, Drug and Cosmetic-Red No. 32) and 18 pounds of AM-Coco-B and heat gently, preferably with stirring, to obtain a suspension of the dye, the necessary amount of hydrochloric or acetic acid being added to neutralize the amine; and preferably, when the amine or AM-Coco-B has melted (if previously in a solid state) and the dye is suspended sufficiently in said ingredients, water is added to about 20 gallons to form a concentrate. This concentrate is further diluted to make a bath by adding it to 25 parts of water for each part of concentrate. The oranges are contacted by the bath (as by floating or submerging or the like in said bath) at temperatures ranging between about 104° F. to 118° F. for a period of time which gives a permanent satisfactory color depending upon the character of the peel, this period of time being usually about 4 minutes, a little more or a little less. Excellent results have been obtained with a bath temperature between 110 and 112 degrees F. An orange so treated has a uniform color and is free from blotching and of the maximum legal intensity. It is to be noted that the temperature employed is well below the legal maximum of 124° F. and the color is satisfactory in every respect. The temperature of the bath may be reduced from that state, provided the oranges remain therein for a longer period of time. The bath is acid in reaction as it contains the salt made by the combination of a weak base and a strong acid.

The other amine compounds, mentioned above, may be mixed and prepared with the dye and water in substantially the same manner and proportions as stated in the example or formula just given. This formula may be further enhanced by the addition of a amount of higher alcohols having limited water solubility, such as alpha terpineol, terpinol, octyl alcohol as a few examples, which acts as anti-foaming agents and which also acts as a solvent for additional dye added to the solution and assist in suspension thereof, when coloring certain types of citrus fruit having a rind more resistant to the penetration of the dye as in the case of Valencia oranges as an example, but this is not necessary to the carrying out of the broad invention.

It is well known to use fungicide in such color baths in order to reduce the spoilage of the fruit after treatment and sodium benzoate is well known for this purpose. However, in the composition of the present bath less fungicide—i. e. sodium benzoate, sodium borate, sodium hypochlorite, calcium hypo-chlorite and others commercially available—is required to preserve the fruit because of its acid medium than in an alkaline bath of the prior art. It is therefore within the contemplated scope of this invention to use approximately $\frac{1}{10}$% of fungicide under the existing acid condition where previously it has been necessary to have 1% or more present.

Many advantages in the process herein disclosed are apparent to one skilled in the art. A better suspension is obtained of the dye in an acid solution by the use of a water soluble salt wherein the dye is in a very fine state of subdivision known as a "suspensoid" thus requiring the use of smaller amounts of dye and more completely utilizing the dye than do known soap alkaline and other bath solutions. It does not have the disadvantages of an added excess of fatty acids or other oily or greasy material used to carry the dye from a suspension to the fruit rind. It operates at a low temperature well within the legal limit to give a colored fruit that is satisfactory in every respect. The acid solution allows the use of a fungicidal agent to prevent mold spoilage.

It is well recognized that the smallest possible amount of fungicidal substances is highly desirable as they are not beneficial to the human system. Certain laws have been passed limiting the use of less than a given percentage of preservative materials. It is, therefore, easily seen that a lower percentage of sodium benzoate or other fungicidal material would be highly desirable if equivalent fungicidal protection could be obtained which is the case with the present invention. Practically all of the materials now used for fungicidal purposes are more active in an acid medium and therefore much less of the fungicidal agent is necessary to produce the desired result.

Other advantages of this process over existing processes is the greater ease for compounding this formula as compared to those containing soap wherein the dye is dissolved in the fatty acid and the soap formed by adding an alkali. This partial neutralization requires more careful control than can be obtained in the average fruit treating plant. Therefore, it is the custom in the trade to ship the concentrate from a central laboratory to the plant. The present process does not require the use of controls of this type and it is therefore possible to prepare the concentrate directly at the plant where it will be used to dye the fruit.

Another advantage resides in the absence of an oily solvent in the bath and the low temperature at which the dyeing process may take place. Previously, the use of higher temperature and/or an oily solvent have resulted in loss of flavor of the fruit, burning the fruit and caused removal of a large part of the natural wax coating of citrus fruit. The present process, by the employment of a lower temperature and an acid bath and the elimination from the bath of oily or oil-like material, gives a coloring bath that does not burn the fruit and produces a superior colored product which retains more of its natural flavor. If desired the fruit may be artificially waxed by known methods to give a higher lustre and provide shrinkage control of the fruit.

Still another advantage of this process over existing processes is the fact that water containing iron or other dissolved mineral matter, such as hard water as is found in those communities where limestone or coral formations are common, may be used directly without a preliminary treatment. This is possible because the bath is acid in reaction and not alkaline as is used today. Therefore, the alkaline earth and metallic elements remain in solution rather than precipitate out as soaps. These foul the dye bath and render it inoperative.

Having thus fully described my invention and set forth as well as possible the composition of the compound purchased under trade names so as to enable others skilled in the art to use and compound the same, I claim as my invention and desire to secure by Letters Patent the following:

That which is claimed, as new, is:

1. In a process of enhancing the varietal color of citrus fruit, the step of bringing the fruit into contact with a dye suspended in the solution of a salt of an amine, said amine having at least one hydrocarbon chain of at least 10 to 20 carbon atoms.

2. In a process of enhancing the varietal coloration of citrus fruit, the step of bringing the fruit into contact with an edible oil soluble dye suspension in an aqueous solution of an aliphatic substituted amine salt of a strong acid, said solution having an acid reaction by virtue of the salt contained therein.

3. A bath for enhancing the varietal color of citrus fruit containing an edible oil soluble dye and a substituted ammonium salt having at least one hydrocarbon chain of 10 to 20 carbon atoms.

4. In a process of enhancing the varietal color of citrus fruit, the step of bringing the fruit into contact with a dye suspended in a solution of a salt of a dodecyl amine.

5. In a process of enhancing the varietal color of citrus fruit, the step of bringing the fruit into contact with a dye suspended in a solution of a dodecyl ammonium chloride.

6. In a process for enhancing the varietal color of citrus fruit, the step of bringing the fruit into contact with a dye suspension in a solution containing the salt of the condensation product of ethylene oxide and a primary amine having a side chain containing 10 to 20 carbon atoms.

7. A process for enhancing the varietal color of citrus fruit, the step of bringing the fruit into contact with a dye suspended in a solution of ammonium salt wherein one hydrogen is substituted by a hydrocarbon residue obtained from abietic acid.

8. A process for enhancing the varietal color of citrus fruit, the step of bringing the fruit into contact with a dye suspended in an aqueous solution of a substituted ammonium salt, having at least a hydrocarbon chain of 10 to 20 carbon atoms, and containing a higher alcohol.

9. A process for enhancing the varietal color of citrus fruit, the step of bringing the fruit into contact with a dye suspended in a solution of a substituted amine salt having at least a hydrocarbon chain of 10 to 20 carbon atoms and containing alpha terpineol.

CARL E. GERICKE.

No references cited.